(12) United States Patent
Portela Parente et al.

(10) Patent No.: US 11,003,430 B2
(45) Date of Patent: May 11, 2021

(54) METHOD OF ENFORCING CONTROL FLOW INTEGRITY IN A MONOLITHIC BINARY USING STATIC ANALYSIS

(71) Applicant: SAMSUNG ELETRÔNICA DA AMAZÔNIA LTDA., São Paulo (BR)

(72) Inventors: Vladimir Portela Parente, Campinas (BR); Alexandre Prado Teles, Campinas (BR)

(73) Assignee: SAMSUNG ELETRÔNICA DA AMAZÔNIA LTDA., Sao Paulo (BR)

( * ) Notice: Subject to any disclaimer, the term of this patent is extended or adjusted under 35 U.S.C. 154(b) by 0 days.

(21) Appl. No.: 16/376,579

(22) Filed: Apr. 5, 2019

(65) Prior Publication Data

US 2020/0210161 A1 Jul. 2, 2020

(30) Foreign Application Priority Data

Dec. 28, 2018 (BR) ...................... 10 2018 077436 0

(51) Int. Cl.
| | |
|---|---|
| *G06F 8/52* | (2018.01) |
| *G06F 8/41* | (2018.01) |
| *G06F 9/32* | (2018.01) |
| *G06F 16/901* | (2019.01) |
| *G06F 21/57* | (2013.01) |
| *G06F 21/52* | (2013.01) |
| *G06F 21/54* | (2013.01) |
| *G06F 8/54* | (2018.01) |

(52) U.S. Cl.
CPC ................. *G06F 8/52* (2013.01); *G06F 8/41* (2013.01); *G06F 8/433* (2013.01); *G06F 8/54* (2013.01); *G06F 9/322* (2013.01); *G06F 16/9024* (2019.01); *G06F 21/52* (2013.01); *G06F 21/577* (2013.01)

(58) Field of Classification Search
CPC ... G06F 8/41; G06F 8/433; G06F 8/52; G06F 8/53; G06F 9/322; G06F 16/9024; G06F 21/52; G06F 21/54; G06F 21/577
USPC .................................................. 717/155–157
See application file for complete search history.

(56) References Cited

U.S. PATENT DOCUMENTS

| | | | |
|---|---|---|---|
| 8,997,256 B1 * | 3/2015 | Rogers | .................... G06F 21/12 726/32 |
| 9,177,147 B2 * | 11/2015 | Fischer | ................... G06F 21/52 |
| 2017/0140148 A1 | 5/2017 | Gleeson et al. | |

OTHER PUBLICATIONS

Roemer, R., et al., Return-Oriented Programming: Systems, Languages, and Applications, ACM Transactions on Information and System Security, Mar. 2012, 34 pages, [retrieved on Feb. 8, 2021], Retrieved from the Internet: <URL:http://dl.acm.org/>.*

(Continued)

*Primary Examiner* — Geoffrey R St Leger

(57) ABSTRACT

Method of enforcing control flow integrity (CFI) for a monolithic binary using static analysis by: marking evaluated functions as core functions by a chosen heuristic or empirically; generating a binary call graph; merging all function nodes of core functions as a node of highest privilege (set 0); merging all leaf functions in one node without privilege (set n); merging all nodes without privilege that reach functions of privilege i and setting the merged node privilege to i+1; checking if there is a node without privilege besides a trivial function; in a positive case, returning to merging all nodes without privilege and setting the merged node privilege to i+1; and in a negative case, setting the privilege of trivial functions as i+2.

1 Claim, 6 Drawing Sheets

(56) References Cited

OTHER PUBLICATIONS

Bietsch, T., et al., Jump-Oriented Programming: A New Class of Code-Reuse Attack, Proceedings of the 6th ACM Symposium on Information, Computer and Communications Security, Mar. 2011, pp. 30-40, [retrieved on Feb. 8, 2021], Retrieved from the Internet: <URL:http://dl.acm.org/>.*

Payer, M., et al., Safe Loading—A Foundation for Secure Execution of Untrusted Programs, 2012 IEEE Symposium on Security and Privacy, May 20-23, 2012, pp. 18-32, [retrieved on Feb. 8, 2021], Retrieved from the Internet: <URL:http://ieeexplore.ieee.org/>.*

* cited by examiner

METHOD OF ENFORCING CONTROL FLOW INTEGRITY IN A MONOLITHIC BINARY USING STATIC ANALYSIS

CROSS-REFERENCE TO RELATED APPLICATIONS

This application claims the foreign priority benefit of Brazilian Patent Application No. 10 2018 077436 0, filed on Dec. 28, 2018 in the Brazilian Intellectual Property Office, the disclosure of which is incorporated herein by reference.

FIELD OF THE INVENTION

The method of the present invention relates to enforcing the Control-Flow Integrity (aims to avoid code-reuse attack) in a more strict manner but, at the same time, keeping the performance of a monolithic binary at an acceptable level. Moreover, this enforcement has the specific goal of protecting the core functions of the system. Because these core functions manage system critical aspects, such as privilege credential and init execution for example, this Control Flow Integrity (CFI) enforcement is essential to decrease the attack's surface without compromising systems functionalities and performance.

The method of the present invention can be used alone in order to enforce a CFI and can also be used in conjunction with complementary CFI methods, such as the Clang CFI of indirect calls used in Android P, that checks the function prototype.

BACKGROUND

In the last decade, attackers would exploit vulnerabilities by using a memory corruption and, therefore, overwriting the return address of a function in order to point it at a desired code by them. This code was in a great number of times injected in a region that was supposed to hold only data used by the program, like, for example, a vulnerable buffer (an attacker could write in it).

With the advent of the W⊕X feature, memory could only be marked as writable or executable at one time, but not both. Therefore, an attacker could overwrite the return address of a function but could no longer inject arbitrary code in a buffer in order to be executed when the return occurs because the region of memory specified for this buffer was marked as writable and non-executable.

Without code injection, the natural idea for an attacker was to use the code already available in the system because the overwriting of the return address was still possible, even with some defenses deployed against it such as the canary. This type of attack is known as Code Reuse Attack (CRA). An example of exploitation in this case would be than an attacker that could make a return address simply point to system/bin/sh. This type of specific CRA which targets mostly functions from libc is known as ret2libc. It diverts the program flow in other to call a target libc function. By restricting the control-flow of libc functions, this attack became more difficult to be deployed.

Return-oriented programming (ROP) was the next step in the exploit evolution. It is a more complex attack capable of creating a Complete Turing Set, or, in other words, perform any desired computation for the adversary (create a Turing Machine). In this scenario, first, the attacker identifies gadgets, which are often small blocks of codes that end in a return instruction. Second, the attacker builds his attack chain by choosing the proper gadgets to be used. Finally, the attacker creates the payload that will be put on the stack. In order to contain this type of attack, similar to the Ret2libc, it is necessary to enforce that the program follows its correct control-flow.

The next step in attack evolution was Jump-oriented programming (JOP). In a simple way, instead of using return instructions for diverting the program flow, JOP uses explicit jump instructions to chain the gadgets. Similar to the ROP case, the best defense against this attack is control-flow enforcement.

One important aspect is that Address Space Layout Randomization (ASLR) is a great defense tool that works against code-injections and against code reuse attacks. In its simple version, it adds a random offset to the program starting address. With this feature, it is harder for an attacker to use functions of a specific lib and to find proper executable gadgets. However, in 32-bit system, the entropy available to randomize the address space is not too high and an attacker can use a brute force search in order to reveal the target addresses. Moreover, if a single address of a global variable is discovered, then all the randomization done by the ASLR is thwarted. Besides this, even if just a local variable has its address revealed, then the attacker already has the layout of, for example, an entire lib, which makes exploitation easier. Therefore, ASLR enhances security, but it cannot be the only defense deployed against these attacks. Some other orthogonal method(s) must be used.

Theoretically, ROP/JOP and their variant can be defended by simply following the correct and expected program flow. However, correctly estimating the call graph of a program, which is necessary for the enforcement, is a known undecidable problem. Therefore, some relaxations or assumptions have to be made in order to make this problem solvable in this context.

Although, if even the correct and complete (or a good approximation) call graph was available, the control-flow enforcement would be too costly, every change in the program flow would have to be analyzed by searching in a large data structure. This approach could compromise performance, which would make the deployment of such security solution undesirable and impossible in a competitive device market such as the one of smartphones.

Concluding, a solution that enforces the program flow that is the more restrict possible regarding keeping the security of the device and, at the same time, maintaining performance at acceptable levels is essential to defend against ROP/JOP attack type.

In the current state of art, there are solutions and technologies that aim to achieve the same goal of the present invention, which is to enforce the CFI of a program.

The paper titled "ACES: Automatic Compartments for Embedded Systems" (USENIX 2018) discloses a new LLVM(Low Level Virtual Machine)-based compiler that creates compartments in a bare-metal system in order enforce their isolation based on the least privilege. It focuses on ARMv7-M devices.

In order to create the components, the Program Dependency Graph (PDG) was used. The isolation of components was done for not only transitions between them, but also for system resources access.

Although, the idea of separating the functions by sets is close to one of the invention concepts, its generation is based on the PDG instead of the call graph. Also, its policy is not made for isolating functions but system resources in general. Therefore, a more complex checking must be made in a great number of situations. With this, the overhead of the solution is considerably large, which is inadequate for systems that have strong constraints such as battery consumption.

The paper titled "DROP THE ROP Fine-grained Control-flow Integrity for the Linux Kernel" (Black Hat Asia 2017) creates a method of CFI enforcement for the Linux kernel (monolithic binary) by checking if the function prototype of the called function matches the one expected as the called party.

In order to create a more restrict CFI, a technique called Call Graph Detaching (CGD) is used. It simply avoids using direct calls to generate the allowed policy for prototypes.

The policy in this case is made focusing on function prototypes and, possibly, a search in a data structure is needed in order to check if the flow should be allowed or not. This may compromise performance as shown by the executed experiments. Also, the use of CGD is against the concept of protecting key functions because it will hide who is actually accessing them.

The ARM Pointer Authentication (described in Qualcomm website https://www.qualcomm.com/media/documents/files/whitepaper-pointer-authentication-on-armv8-3.pdf) is a method available for the ARMv8.3-A variant that aims to make it harder for an attacker to modify protected pointers. By encrypting the pointer with the QARMA cipher with the key hold in a reserved register not accessible to EL0, the pointer becomes unusable, only available for reading. With this, the control-flow is enforced by maintaining the original intended call of the pointer's content.

This method only works for execution in the user space because the register used to hold the key has to be in a higher privileged exception level. In addition, this method should be used in pointers that are not frequently used to avoid performance overheads. In addition, this is one way to keep the program flow in a non-malicious behavior. Concluding, the invention CFI enforcement approaches can work orthogonally with this mechanism in order to improve security.

Many solutions (as for example the paper titled "DROP THE ROP Fine-grained Control-flow Integrity for the Linux Kernel and Clang CFI for Indirect Calls used in Android P") enforces CFI by checking if the prototype of the called function (in execution time) matches the expected prototype. In few words, the enforcement of the present invention checks if a call to a core function is allowed or not regardless of the prototype. Therefore, both checks are different and orthogonal. Concluding, they could run in the same binary in order to check if the flow is correct.

Some solutions as the patent US 2017/0140148 A1, published on May 18, 2017, and the Return Attack Protection (RAP from PaX) works by encrypting the return address at function prologue and decrypting just before returning to the calling party. The invention method to prevent ROP in this case would occur as an additional check in order to avoid exploitation if this type of mechanism was bypassed.

Concluding, the existing technologies does not use the concept of core functions and of creating a policy in order to restrict access to them. Therefore, the invention has a significantly difference when compared with the closest technologies.

SUMMARY OF THE INVENTION

The present invention is related to the security field of technology. Specifically, it describes a way to enforce control-flow integrity (CFI) for a generic monolithic binary (self-contained) only through static analysis although the use of dynamic analysis increases the reliability of the control-flow graph used.

The enforcement method of the present invention has two main goals. The first is to protect the considered core functions of the system. In order to be considered core, a function is evaluated by a chosen heuristic or empirically. In this context, for example, the analyzed binary could be the Linux kernel and the core functions could be all functions related to the credentials of a thread. The second goal is to keep the functioning (semantics) of the binary unaltered. In this way, even that an attacker is able to call some functions of the binary he will not have access to the critical part that will give him the desired resources of the system.

The main idea is that each core function is critical for system functioning (from a specific point of view) and a wrong call (could be from an attacker) to them may compromise the entire system. Therefore, all of them should be grouped as one core component with restrict access. After grouping the core functions, it can be seen that any function that can access directly this core component, which has restricted access now, is the new target for an attacker. However, the same idea can be recursively applied and a CFI enforcement for the entire binary is created. In this way, the first goal of protecting core functions of the system is achieved. The second goal is accomplished by avoiding the use of a large data structure to hold the relationships between the functions (when merged, the components) because of the search cost. This is done by using a simple transitive relationship between them that is easily evaluated.

Specifically, the present invention relates to a method of enforcing control flow integrity (CFI) for a monolithic binary using static analysis comprising the steps of: marking some evaluated functions as core functions by a chosen heuristic or empirically; generating the binary call graph; —if the binary call graph is incomplete, then: create call graph from static analysis; set privilege 2 for functions with incomplete estimation; set ad hoc privilege for specific functions; generate the policy; —merging all function nodes of core functions as a node of highest privilege (set 0); —merging all the leaf functions in one node without privilege (set n); —merging all nodes without privilege that reach functions of privilege i and setting the merged node privilege to i+1; —checking if there is a node without privilege besides the trivial function; in positive case, returning to the previous step of merging all nodes without privilege and setting the merged node privilege to i+1; in negative case, setting the privilege of the trivial functions as i+2;

This method not only avoids JOP, but it creates new layers of security that restrict the access to essential (core) functions related to the security of the whole system. If an attacker wants to access a core function, then he will have to create a longer more complex chain.

This method does not require a complete call graph of the binary. It can work solely with the use of static analysis, even if the call graph is incomplete. The use of dynamic analysis only improves the call graph accuracy, which, in the end, will also improve security.

This method can be applied to binaries of a great variety of architectures (including ARM, x86) with some minor adjustments.

Because this method instruments each function call in part by adding the privilege of the function after the instruction responsible for the call (direct or indirect), it is enforced that only aligned instructions can be used to call a function or return. It is highly unlikely that an attacker manages to find an unintended call or return instruction before a valid caller privilege. Summarizing, this method helps to avoid JOP and ROP in a misaligned ISA by decreasing the number of unintended instructions.

The CFI of the program is enforced in a way that is closer to the best CFI than other solutions while keeping performance.

In addition, this invention helps to avoid ROP attacks by checking if the reverse flow is correct by using the same policy generated.

In summary, the method of the present invention enforces a CFI that protects essential functions and, at the same time, keeps the behavior and the performance of the binary. If used at, for example, the Linux kernel, which runs in a higher privilege and is a target of a great number of attacks, it would enhance the security of systems based on this kernel as, for example, Android.

BRIEF DESCRIPTION OF THE DRAWINGS

The objectives and advantages of the current invention will become clearer through the following detailed description of the example and non-limitative pictures presented at the end of this document.

DETAILED DESCRIPTION

In Jump-Oriented Programming (JOP), the attacker will try to execute gadgets in a chain in order to perform exploitation. The attacker will simply overwrite the content of a register that points directly or indirectly to a function address. To avoid this, one first line of defense is done by enforcing that an instruction intended to call a function can only be used if the address is indeed pointing to the beginning of a function.

Figure 1:
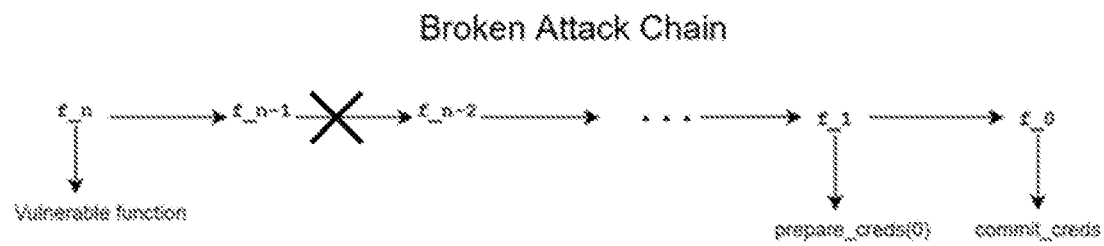
FIG. 1 discloses an example of attack chain that starts at the vulnerable function f_n and goes until commit_creds (prepare_creds(0)) is executed.

However, as shown by FIG. 1, a simple attack chain can be constructed by an attacker in order to have, for example, root privilege by calling commit_creds(prepare_creds(0)) at the Linux kernel level. It is noted that this chain starts from a vulnerable function that is exploited and an attack chain is created to perform the calling. For the attacker, it does not matter if the program flow is correct or not as long as the exploitation goal is accomplished. Therefore, two things can be concluded. First, exploitation is still possible using JOP, only the number of available gadgets has been reduced. Second, it is easier for the attacker to build this chain from function f_n if he has a great number of possible functions f_n−1 that can be used in the chain at intermediary steps.

Figure 2:
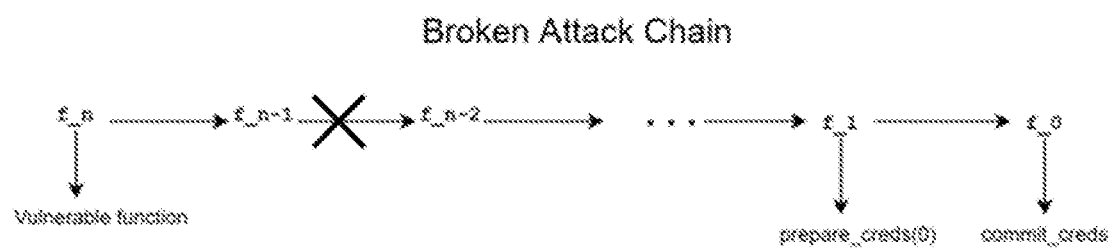
FIG. 2 discloses the same attack chain of FIG. 1 but with the difference that f_n−1 calling f_n−2 is not allowed anymore by CFI enforcement.

FIG. 2 discloses the same function chain used, but, at this time, the CFI enforcement does not let f_n−1 call f_n−2 and, therefore, the attack is avoided. In this scenario, the attacker will have to look for another function to use, which increases the overall complexity of the attack.

Figure 3:
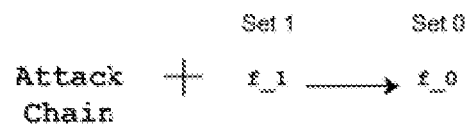
FIG. 3 discloses an exemplar scenario where the attacker has as target calling f_0, he already has a chain formed but has to necessarily pass through f_1.
Figure 4:
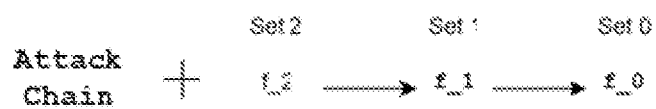
FIG. 4 discloses a scenario similar to FIG. 3 but having two security layers before calling f_0.

FIG. 3 discloses an attack chain in the scenario that functions from set 0, the attack's target, can only be called by functions from set 1. In this case, the attacker will have to build a chain and necessarily add a function from set 1 and a function from set 0. FIG. 4 discloses a similar scenario but with three obligatory sets, which adds another layer of complexity for the attacker.

Figure 5:
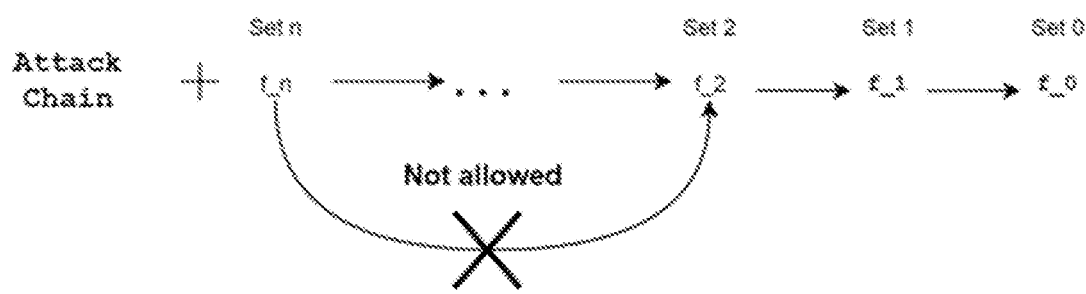
FIG. 5 discloses the general case of FIGS. 3 and 4 with n security layers.

FIG. 5 discloses a similar scenario when compared to FIGS. 3 and 4. In this general case, the attacker must create a chain, but it must go through all the n functions (n sets) in order to reach his target (set 0). This final target set possibly has critical functions of the binary. For example, if the analyzed binary was the kernel, this set could have functions related to processes credentials. Therefore, this set 0 will be called as the core function set, which, logically, has core functions. In the same FIG. 5, it is shown that if the attacker tries to jump from function f_n (set n, less privileged) to function f_2 (set 2, more privileged), then the execution is interrupted, and an error is raised.

Figure 6:
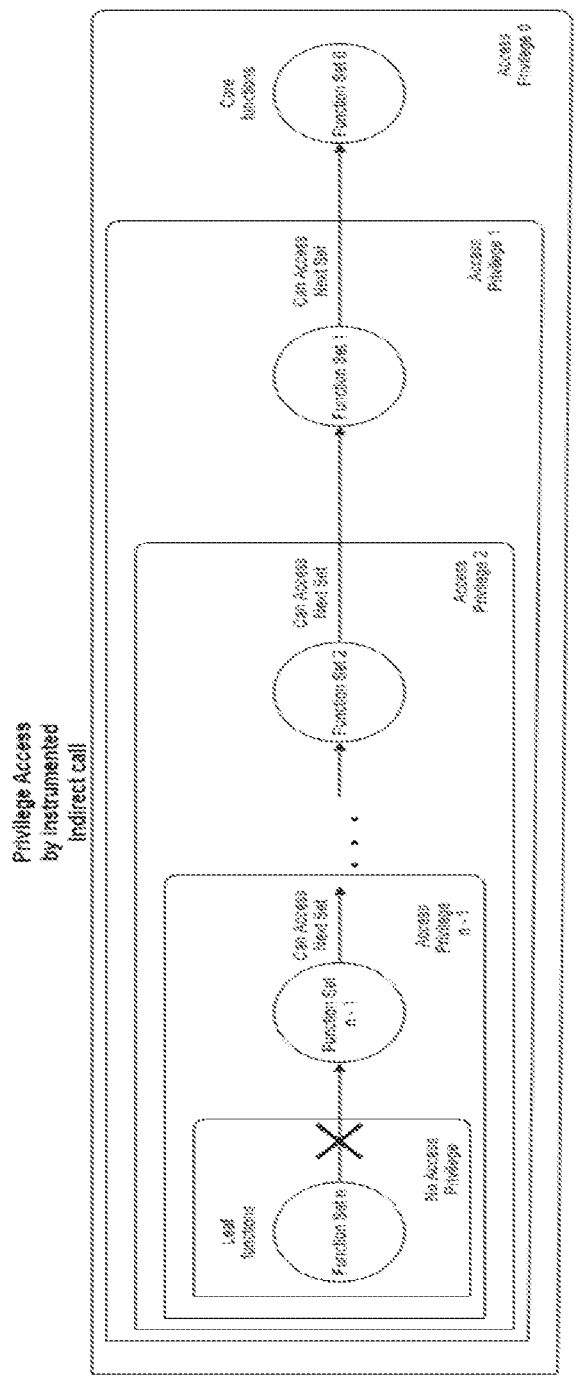
FIG. 6 discloses the indirect call policy of the present invention.

FIG. 6 discloses the method according to an embodiment of the present invention. All core functions are empirically marked and grouped at set 0. This set has the highest privilege and can access (call) a function from any other privilege level. The next set (set 1) has privilege to access the core set and all the functions below this privilege access (all privileges greater than 0). Set 2 follows the same pattern, it has access to set 1 and all the sets below including itself, but it does not have access to set 0. This will occur to every set until the last set is formed by only leaf functions that have no access rights. Summarizing, the access rule is that the most privileged set that a function of privilege level I can access is the one of privilege I−1 (it can also access functions with privilege greater than I or equal). For example, a function with privilege 5 can call functions with privilege 4 or greater (which includes its own level, 5, and all levels greater than 5). In order to this enforcement occur, all indirect calls are instrumented with this privilege checking. Also, by applying the reverse flow of FIG. 6, a protection against ROP is made with the same sets. One important note about the privilege access is that although sets 0 and 1 can access exactly the same sets, the set 0 can only be accessed by the set 1 and by itself while the set 1 can be accessed by the sets 0, 1 and 2. Therefore, set 1 acts as a first layer of protection for set 0.

Figure 7:
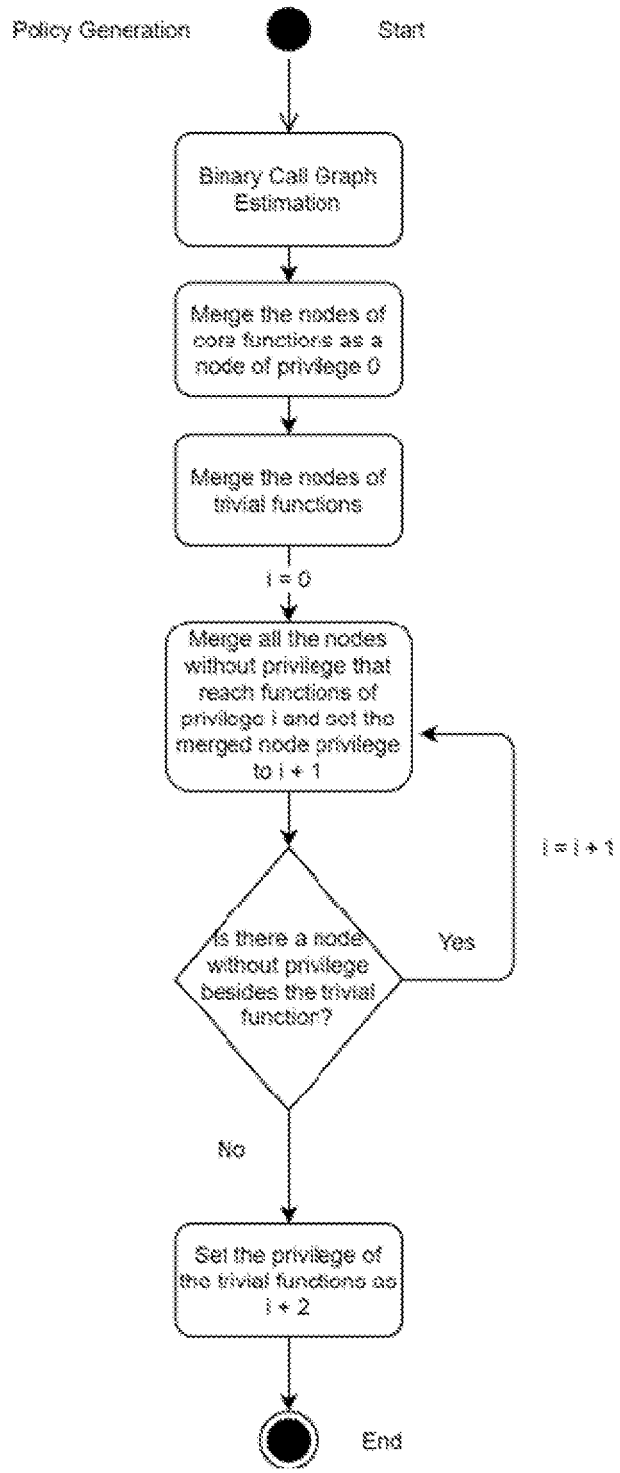
FIG. 7 discloses a flowchart of the Policy Generation method.
Figure 8:
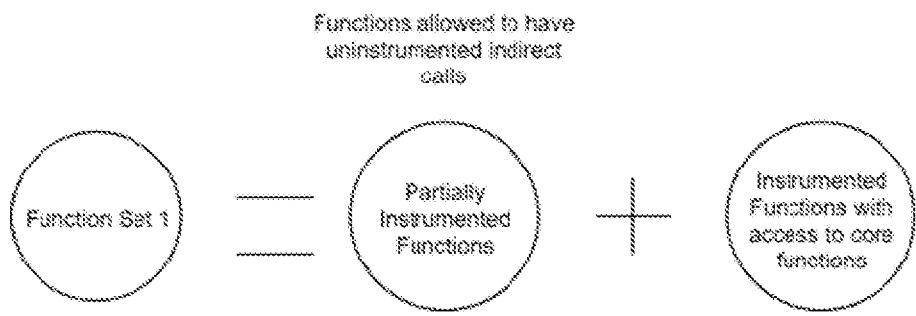
FIG. 8 discloses how the set 1 is constructed.
Figure 9:
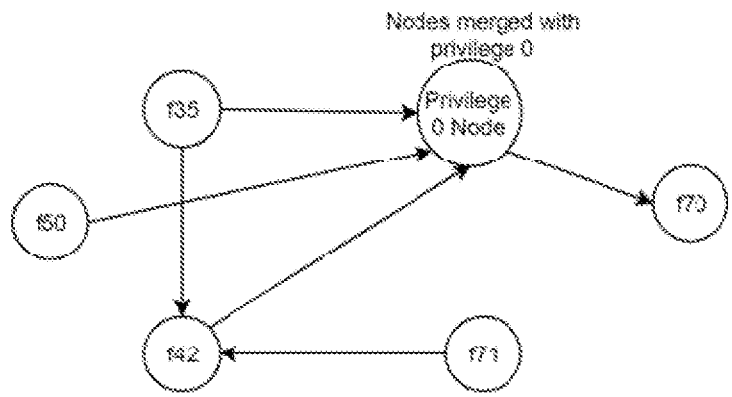
FIG. 9 discloses an example of the merging algorithm for the set 1 before the actual merging.
Figure 10:
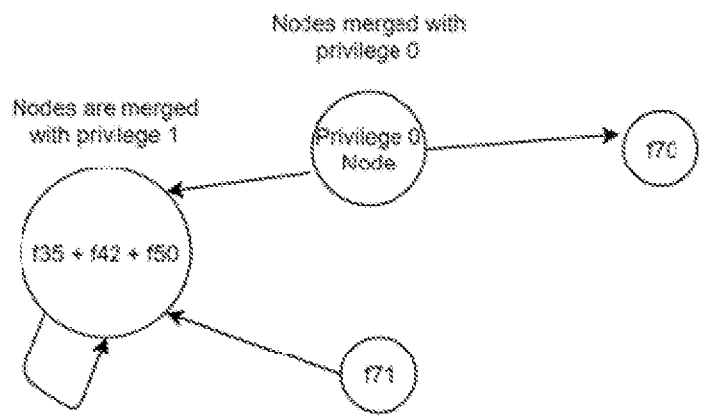
FIG. 10 discloses an example of the merging algorithm for the set 1 after the actual merging.
Figure 11:
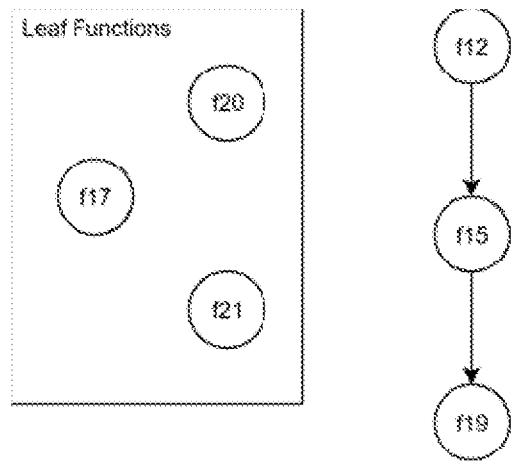
FIG. 11 discloses an example of the merging algorithm for the leaf set before the actual merging.
Figure 12:
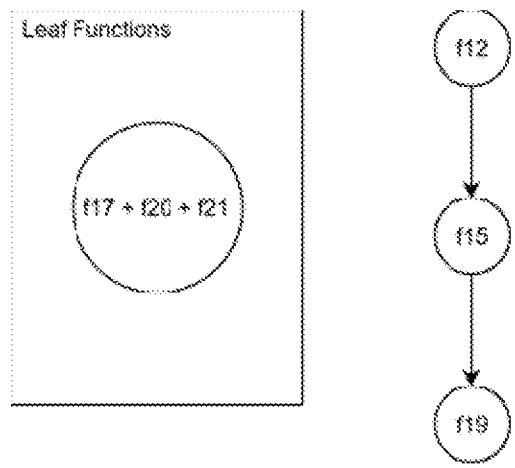
FIG. 12 discloses an example of the merging algorithm for the leaf set after the actual merging.

The problem at this point is how to define which set each function belongs to or, in other words, the policy that must be applied. FIG. 7 describes the Policy Generation algorithm. Given the call graph of the binary and all marked core functions, recursively it is checked which functions call the target set at the moment (starting from 0 and incrementing at each step) until there are only leaf functions with the least access privilege. It is important to notice that some functions must have some calls not instrumented at all in order to keep the binary functionalities. This occurs when the calling party function has been implemented in a way that the instructions used for calling a function can be used in a context where the destination address is in the middle of a function instead of the entry point. This scenario is likely to happen if some functions are written directly in Assembly. Therefore, they are allowed to keep non-instrumented direct calls. As shown by FIG. 8, because a function with a non-instrumented call can go to any function, the components of the set 1 are made of functions that can access the core directly or indirectly in any context (instrumented or not). The merging algorithm used in the Policy Generation is shown in FIG. 9 (before) and FIG. 10 (after) for set 1 and FIG. 11 (before) and FIG. 12 (after) for the leaf functions set.

Figure 13:
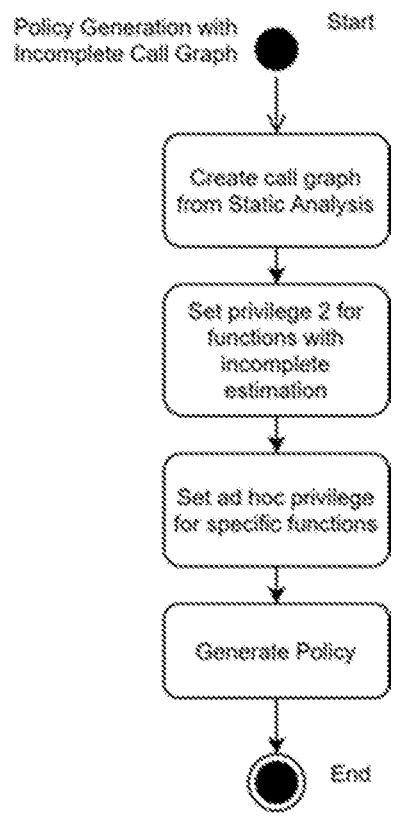
FIG. 13 discloses the algorithm flowchart of the Policy Generation with incomplete call graph.

One problem with the Policy Generation algorithm is that it relies on the call graph of the binary, which may be incomplete. In order to solve this problem and keep the binary functionalities as expected, an extension is made on the Policy Generation as described by FIG. 13. The first increment is that all functions with detected incomplete estimation that do not access any core functions is put at set 2. The second is that ad hoc rules are inserted. With this, the binary functionalities are kept because a function from set 1 can access any other, which keeps the binary functionalities regardless of the call graph, and, in a similar manner, a function from set 2 can access any other except from set 0. In this case, if a misclassified function from set 2 actually accesses a core function, then its privilege is enhanced to 1 in the ad hoc insertion phase. However, this is an unlikely scenario, because access of core functions is possibly supervised. Therefore, this improvement on the Policy Generation makes this enforcement method feasible.

Figure 14:
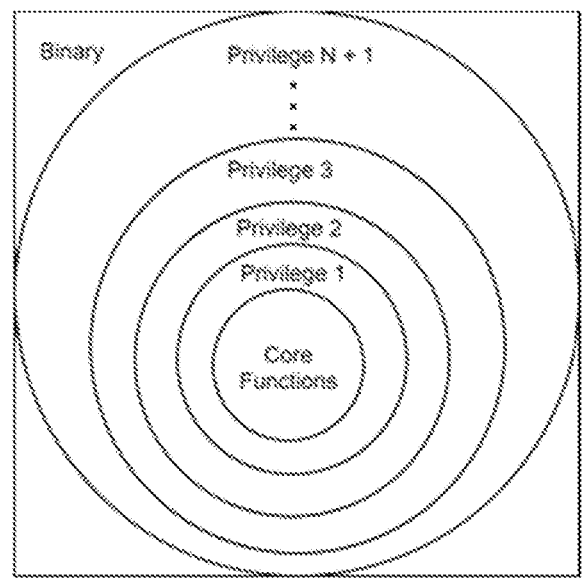
FIG. 14 discloses a view of the monolithic binary with all the security layers and with the core set at the center.

FIG. 14 discloses how the binary is seen with all the security layers added. The core functions are at the center only available to be called by themselves and by the previous layer.

In order to enforce the policy for the JOP protection, the binary is instrumented in the following way: before every function entry point the function, privilege is inserted and before each instrumented indirect call this privilege is put after. One important note is that it is possible that the core functions do not have their privilege before the entry point to avoid any indirect call. In the instrumented call two things are done. The first is to check if the calling party can actually call the called party. If not, then raise an error. The second is to put the return address to the proper location if necessary. For the ROP protection, it is required to insert after every function call the privilege after and instrument the return instructions. This is needed because when a function returns it does not know if the call was directly or indirectly. Furthermore, it is inserted the function's privilege after the instrumented return instruction. Because usually in the return instruction only the target is kept as information, it is necessary to reserve a register to hold the calling party address and, therefore, verify if the return is allowed by the policy.

The original idea of CFI is to check if every tuple of calling party-called party (source and target) is valid. However, if no relaxation is used, this approach has a high cost because it is necessary to search at runtime in a data structure for a specific tuple. Therefore, a more feasible CFI is needed if the security improvement is desired.

By using the method of the present invention, the performance of the binary is maintained because the policy check is simple, it can be just a verification if the calling party privilege is less or equal than the called party privilege plus one. Therefore, the costly search in a data structure at runtime is avoided by inserting undefined instructions (data) in the binary.

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

The invention claimed is:

1. A method of enforcing control flow integrity (CFI) for a monolithic binary using static analysis, the method comprising:
performing, by at least one processor, operations to enforce the CFI while protecting essential functions and maintaining a behavior and a performance of the monolithic binary, the operations including:
marking some evaluated functions as core functions by a chosen heuristic or empirically;
generating a binary call graph;
when the generated binary call graph is incomplete, then:
creating a call graph from static analysis;
setting a privilege 2 for functions with incomplete estimation;
setting an ad hoc privilege for specific functions; and
generating a policy;
merging all function nodes of core functions as a node of highest privilege (set 0);
merging all leaf functions in one node without privilege (set n);
merging all nodes without privilege that reach functions of privilege i and setting the merged node privilege to i+1;
checking whether there is a node without privilege besides a trivial function; and
based on a result of the checking:
in a positive case, returning to merging all nodes without privilege and setting the merged node privilege to i+1; and
in a negative case, setting the privilege of trivial functions as i+2,
wherein the privilege of each function is put before an entry point of each function.

* * * * *